(12) United States Patent
Kimura et al.

(10) Patent No.: US 11,530,749 B2
(45) Date of Patent: Dec. 20, 2022

(54) SEAL RING

(71) Applicant: EAGLE INDUSTRY CO., LTD., Tokyo (JP)

(72) Inventors: Wataru Kimura, Tokyo (JP); Yuichiro Tokunaga, Tokyo (JP); Yoshiaki Takigahira, Tokyo (JP); Toru Kono, Tokyo (JP); Hidetoshi Kasahara, Tokyo (JP); Jun Hiromatsu, Tokyo (JP); Takafumi Ota, Tokyo (JP)

(73) Assignee: EAGLE INDUSTRY CO., LTD.

( * ) Notice: Subject to any disclaimer, the term of this patent is extended or adjusted under 35 U.S.C. 154(b) by 111 days.

(21) Appl. No.: 17/047,369

(22) PCT Filed: May 16, 2019

(86) PCT No.: PCT/JP2019/019499
§ 371 (c)(1),
(2) Date: Oct. 13, 2020

(87) PCT Pub. No.: WO2019/221227
PCT Pub. Date: Nov. 21, 2019

(65) Prior Publication Data
US 2021/0116032 A1 Apr. 22, 2021

(30) Foreign Application Priority Data
May 17, 2018 (JP) .............................. JP2018-095697

(51) Int. Cl.
*F16J 15/34* (2006.01)
*F16J 15/16* (2006.01)

(52) U.S. Cl.
CPC ......... *F16J 15/3412* (2013.01); *F16J 15/164* (2013.01); *F16J 15/342* (2013.01); *F16J 15/3416* (2013.01)

(58) Field of Classification Search
CPC .... F16J 15/164; F16J 15/3412; F16J 15/3416; F16J 15/342; F16J 15/441
See application file for complete search history.

(56) References Cited

U.S. PATENT DOCUMENTS 3,695,789 A * 10/1972 Jansson ................ F01C 21/003
418/133
5,092,612 A 3/1992 Victor et al. ............. F16J 15/34
(Continued)

FOREIGN PATENT DOCUMENTS

| CN | 201448439 | 5/2010 | ............... F16J 15/16 |
| CN | 102619742 | 8/2012 | ............... F04B 53/00 |

(Continued)

OTHER PUBLICATIONS

Notice of Allowance issued in related U.S. Appl. No. 17/046,261, dated Jan. 11, 2022, 10 Pgs.

(Continued)

*Primary Examiner* — Nicholas L Foster
(74) *Attorney, Agent, or Firm* — Hayes Soloway P.C.

(57) ABSTRACT

Provided is a seal ring configured so that stable lubrication performance can be provided across a wide range of rotation speed. A seal ring for sealing a clearance between a rotary shaft and a housing includes multiple static pressure grooves provided at a sliding surface of the seal ring and arranged in a circumferential direction, the static pressure grooves being opened on a sealed fluid side and closed on an outer diameter side, a circumferential length of each of the static pressure grooves being shorter than a radial length of each of the static pressure grooves.

5 Claims, 11 Drawing Sheets

(56) References Cited

U.S. PATENT DOCUMENTS

| | | | |
|---|---|---|---|
| 5,169,159 A * | 12/1992 | Pope | F16J 15/441 |
| | | | 277/422 |
| 5,174,584 A | 12/1992 | Lahrman | F16J 15/16 |
| 5,368,314 A * | 11/1994 | Victor | F16J 15/3412 |
| | | | 277/400 |
| 5,385,409 A * | 1/1995 | Ide | F16J 15/3432 |
| | | | 384/138 |
| 5,435,574 A * | 7/1995 | Victor | F16J 15/3412 |
| | | | 277/390 |
| 5,447,316 A | 9/1995 | Matsui | F16J 15/3412 |
| 5,498,007 A | 3/1996 | Kulkarni | F16J 15/3412 |
| 5,529,317 A | 6/1996 | Muller | F16J 15/34 |
| 5,556,111 A * | 9/1996 | Sedy | F16J 15/3412 |
| | | | 277/400 |
| 5,702,110 A | 12/1997 | Sedy | 277/96.1 |
| 6,189,896 B1 | 2/2001 | Dickey et al. | 277/608 |
| 7,258,346 B2 * | 8/2007 | Tejima | F16J 15/3412 |
| | | | 277/400 |
| 7,377,518 B2 * | 5/2008 | Lai | F16J 15/3408 |
| | | | 277/400 |
| 7,744,094 B2 * | 6/2010 | Yanagisawa | F16J 15/342 |
| | | | 277/408 |
| 8,814,433 B2 * | 8/2014 | Tokunaga | F16C 33/741 |
| | | | 384/123 |
| 9,228,660 B2 | 1/2016 | Hosoe | F16J 15/3412 |
| 9,587,745 B2 * | 3/2017 | Itadani | F16J 15/348 |
| 9,611,938 B1 * | 4/2017 | Itadani | F16J 15/3416 |
| 9,695,940 B2 | 7/2017 | Haynes | F16J 15/442 |
| 9,772,037 B2 * | 9/2017 | Itadani | F16J 15/3424 |
| 9,777,840 B2 | 10/2017 | Tokunaga | F16J 15/34 |
| 9,829,109 B2 * | 11/2017 | Itadani | F16J 15/3416 |
| 9,850,953 B2 | 12/2017 | Tokunaga | F16C 32/06 |
| 10,190,689 B2 | 1/2019 | Yoshida et al. | F16J 15/164 |
| 10,267,421 B2 | 4/2019 | Ohya | F16J 15/162 |
| 10,408,349 B2 | 9/2019 | Miyazaki et al. | F16J 15/12 |
| 10,428,948 B2 | 10/2019 | Hosonuma et al. | F16J 15/16 |
| 10,519,966 B2 | 12/2019 | Yamamoto et al. | F04D 29/046 |
| 10,704,417 B2 | 7/2020 | Tokunaga et al. | F01D 25/16 |
| 10,907,684 B2 * | 2/2021 | Kimura | F16C 33/72 |
| 10,941,863 B2 | 3/2021 | Negishi | F16J 15/3416 |
| 11,009,130 B2 * | 5/2021 | Itadani | F16J 15/3284 |
| 11,053,974 B2 * | 7/2021 | Negishi | F16C 33/107 |
| 11,143,232 B2 | 10/2021 | Negishi et al. | F16J 15/34 |
| 11,221,071 B2 * | 1/2022 | Sasaki | F16J 15/3412 |
| 11,293,553 B2 * | 4/2022 | Kimura | F16J 15/3272 |
| 11,320,051 B2 * | 5/2022 | Seki | F16J 15/441 |
| 2005/0212217 A1 | 9/2005 | Tejima | F16J 15/3412 |
| 2005/0263963 A1 | 12/2005 | Lai | F16J 15/3408 |
| 2007/0296156 A1 | 12/2007 | Yanagisawa et al. | F16J 15/34 |
| 2012/0018957 A1 | 1/2012 | Watanabe | F16J 15/441 |
| 2013/0209011 A1 | 8/2013 | Tokunaga | F16C 33/74 |
| 2015/0123350 A1 | 5/2015 | Itadani | F16J 15/3412 |
| 2016/0003361 A1 | 1/2016 | Takahashi et al. | F16J 15/36 |
| 2016/0033045 A1 * | 2/2016 | Itadani | F16J 15/348 |
| | | | 277/348 |
| 2016/0238134 A1 | 8/2016 | Ohya et al. | F16J 15/162 |
| 2017/0009889 A1 | 1/2017 | Seki et al. | F16J 15/441 |
| 2017/0114902 A1 * | 4/2017 | Itadani | F16J 15/3412 |
| 2017/0130844 A1 * | 5/2017 | Itadani | F16J 15/3412 |
| 2018/0045164 A1 | 2/2018 | Hosonuma et al. | F16J 15/164 |
| 2018/0051809 A1 | 2/2018 | Yoshida | F16J 15/3244 |
| 2018/0058584 A1 | 3/2018 | Miyazaki | F16J 15/441 |
| 2018/0073394 A1 | 3/2018 | Tokunaga | F02C 7/06 |
| 2018/0100584 A1 * | 4/2018 | Park | F16J 15/3272 |
| 2018/0292010 A1 | 10/2018 | Ohya et al. | F16J 15/342 |
| 2019/0285115 A1 * | 9/2019 | Negishi | F16C 33/72 |
| 2020/0182299 A1 * | 6/2020 | Kimura | F16C 17/026 |
| 2020/0182356 A1 | 6/2020 | Itadani | F16J 15/3284 |
| 2020/0217419 A1 | 7/2020 | Seki | F16J 15/441 |
| 2020/0300370 A1 | 9/2020 | Yoshida | F16J 15/411 |
| 2021/0080009 A1 * | 3/2021 | Kimura | F16J 15/3412 |
| 2021/0116029 A1 * | 4/2021 | Kimura | F16J 15/18 |
| 2021/0116030 A1 * | 4/2021 | Kimura | F16J 15/441 |
| 2021/0164571 A1 * | 6/2021 | Kimura | F16J 15/324 |
| 2022/0099138 A1 * | 3/2022 | Suzuki | F16J 15/3412 |
| 2022/0145992 A1 * | 5/2022 | Miyazaki | F16C 33/741 |

FOREIGN PATENT DOCUMENTS

| | | | |
|---|---|---|---|
| CN | 103097782 | 5/2013 | F16J 15/34 |
| CN | 107110202 | 8/2017 | F16C 17/10 |
| CN | 107407417 | 11/2017 | F16J 15/18 |
| CN | 107407424 | 11/2017 | F16J 15/34 |
| CN | 107429844 | 12/2017 | F16J 15/18 |
| CN | 107532726 | 1/2018 | F16J 15/34 |
| CN | 109923340 | 6/2019 | F16J 15/34 |
| DE | 112013004454 | 5/2015 | F16J 15/18 |
| EP | 3273115 | 3/2016 | F16J 15/18 |
| EP | 3273117 | 3/2016 | F16J 15/18 |
| EP | 3543569 | 11/2017 | F16J 15/24 |
| EP | 3299685 | 3/2018 | F16J 15/34 |
| JP | 62-39308 | 8/1987 | F16J 15/34 |
| JP | 3-41268 | 4/1991 | F16J 15/34 |
| JP | 3-88062 | 9/1991 | F16J 15/18 |
| JP | H0388062 | 9/1991 | F16J 15/18 |
| JP | 4-272581 | 9/1992 | F16J 15/34 |
| JP | 5-61566 | 8/1993 | F16J 15/26 |
| JP | 8-28709 | 2/1996 | F16J 15/18 |
| JP | 9-210211 | 8/1997 | F16J 15/18 |
| JP | 10-281299 | 10/1998 | F16J 15/34 |
| JP | 2000-310336 | 11/2000 | F16J 15/16 |
| JP | 2008-275052 | 11/2008 | F16J 15/18 |
| JP | 2009-250378 | 10/2009 | F16J 15/34 |
| JP | 2012-2295 | 1/2012 | F16J 15/34 |
| WO | WO 2014/041832 | 3/2014 | F16J 15/18 |
| WO | WO 2014/142265 | 9/2014 | F16J 15/34 |
| WO | WO 2015/045974 | 4/2015 | F16J 15/46 |
| WO | WO 2015/111707 | 7/2015 | F16J 15/18 |
| WO | WO 2016/148043 | 9/2016 | F16J 15/18 |
| WO | WO2016148043 | 9/2016 | F16J 15/164 |
| WO | WO 2017/065069 | 4/2017 | F16J 15/18 |
| WO | WO2018092742 | 5/2018 | F16J 15/34 |

OTHER PUBLICATIONS

Chinese Official Action issued in related Application Serial No. 201980027746.2, dated Apr. 6, 2022, 10 pgs.

Chinese Official Action issued in related Application Serial No. 201980027673.7, dated Mar. 23, 2022, 10 pgs.

International Preliminary Report on Patentability issued in PCT/JP2019/019498, dated Nov. 17. 2020, with English translation, 6 pages.

International Search Report and Written Opinion issued in PCT/JP2019/019498, dated Jul. 2, 2019, with English translation, 12 pages.

International Preliminary Report on Patentability issued in PCT/JP2019/019499, dated Nov. 17. 2020, with English translation, 8 pages.

International Search Report and Written Opinion issued in PCT/JP2019/019499, dated Jul. 9, 2019, with English translation, 15 pages.

International Preliminary Report on Patentability issued in PCT/JP2019/019500, dated Nov. 17, 2020, with English translation, 12 pages.

International Search Report and Written Opinion issued in PCT/JP2019/019500, dated Jul. 2, 2019, with English translation, 20 pages.

International Preliminary Report on Patentability issued in PCT/JP2019/019501, dated Nov. 17, 2020, with English translation, 6 pages.

International Search Report and Written Opinion issued in PCT/JP2019/019501, dated Aug. 6, 2019, with English translation, 10 pages.

International Preliminary Report on Patentability issued in PCT/JP2019/019505, dated Nov. 17, 2020, with English translation, 6 pages.

International Search Report and Written Opinion issued in PCT/JP2019/019505, dated Jul. 2, 2019, with English translation, 12 pages.

(56) References Cited

OTHER PUBLICATIONS

European Search Report issued in related Application Serial No. 19803635, dated Jan. 25, 2022, 7 pgs.
European Search Report issued in related Application Serial No. 19803232, dated Jan. 26, 2022, 6 pgs.
European Search Report issued in related Application Serial No. 19804382, dated Jan. 26, 2022, 7 pgs.
European Search Report issued in related Application Serial No. 19803913.3, dated Jan. 28, 2022, 7 pgs.
European Search Report issued in related Application Serial No. 19804266.5, dated Jan. 31, 2022, 8 pgs.
Chinese Official Action issued in related Application Serial No. 201980027672.2, dated Mar. 3, 2022, 7 pgs.
Chinese Official Action issued in related Application Serial No. 201980027774.4, dated Mar. 1, 2022, 8 pgs.
Official Action issued in related U.S. Appl. No. 17/048,085, dated Mar. 30, 2022, 9 pgs.
Official Action issued in related U.S. Appl. No. 17/047,645, dated Mar. 30, 2022, 10 pgs.
Official Action issued in related U.S. Appl. No. 17/047,631, dated Apr. 4, 2022, 7 pgs.
U.S. Appl. No. 17/046,261, filed Oct. 8, 2020, Kimura et al.
U.S. Appl. No. 17/047,631, filed Oct. 14, 2020, Kimura et al.
U.S. Appl. No. 17/047,645, filed Oct. 14, 2020, Kimura et al.
U.S. Appl. No. 17/048,085, filed Oct. 15, 2020, Kimura et al.
Notice of Allowance issued in related U.S. Appl. No. 17/047,631, dated August 30, 2022, 8 pgs.
Official Action issued in related U.S. Appl. No. 17/048,085, dated Mar. 30, 2022, 28 pgs.
Official Action issued in related U.S. Appl. No. 17/047,631, dated Apr. 4, 2022, 26 pgs.
Official Action issued in related U.S. Appl. No. 17/047,645, dated Mar. 30. 2022, 29 pgs.
Chinese Official Action issued in related Application Serial No. 201980027742.4, dated May 7, 2022, 8 pgs.

\* cited by examiner

Fig.8
(a)
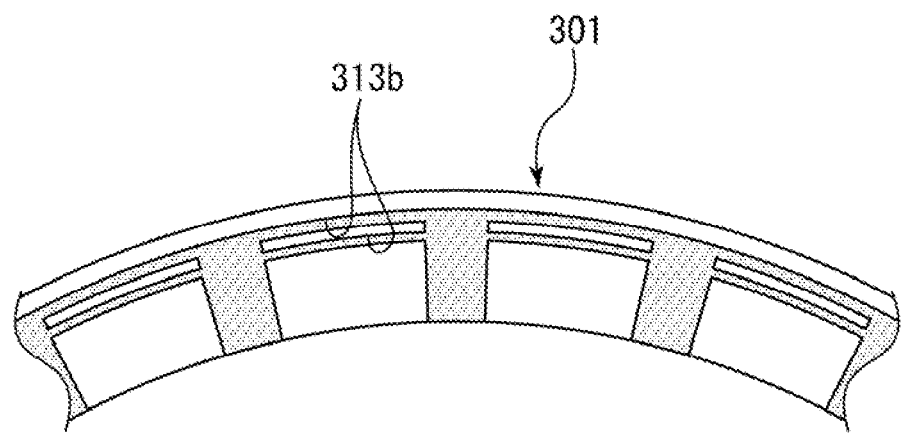
(b)
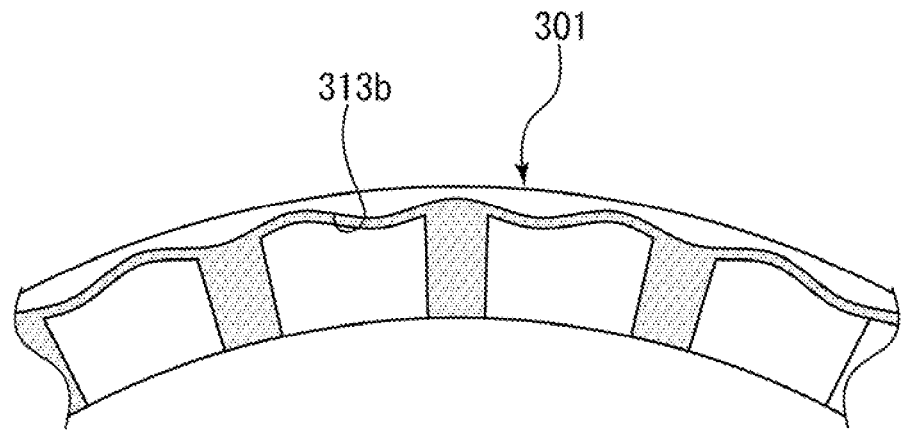

Fig.11
(a)
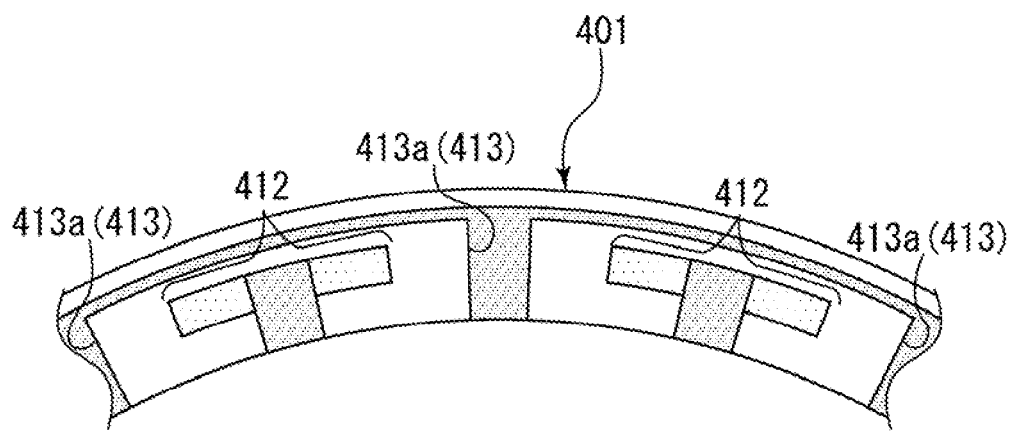
(b)
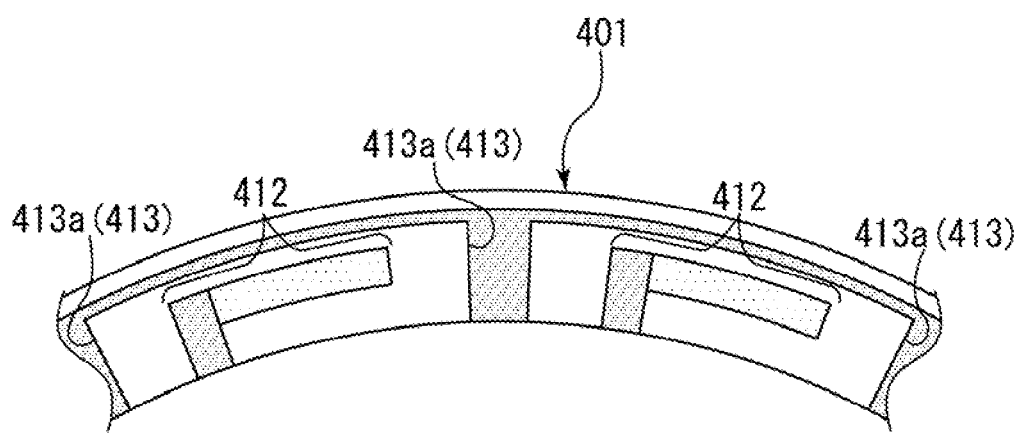
(c)
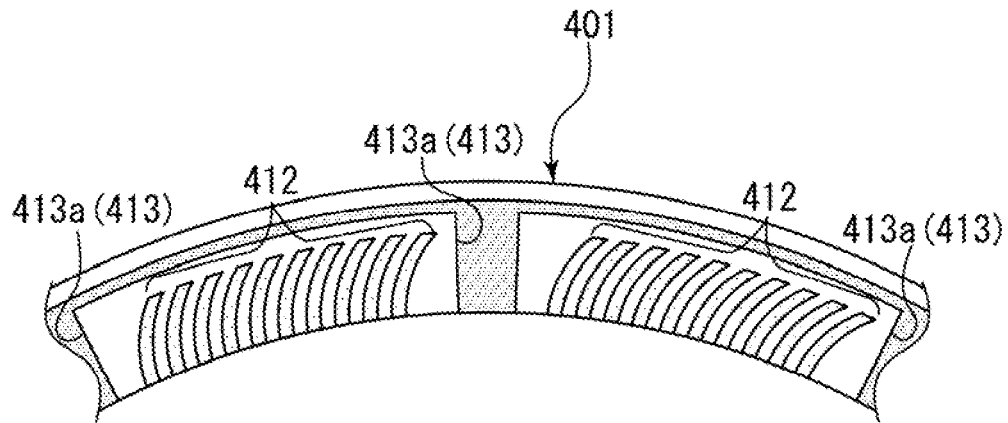

SEAL RING

TECHNICAL FIELD

The present invention relates to a seal ring used for sealing a clearance between a rotary shaft and a housing, and specifically relates to a seal ring used in a state in which the seal ring is attached to an annular groove, i.e., a so-called stuffing box.

BACKGROUND ART

Typically, a seal ring is attached to the outer periphery of a rotary shaft. A sliding surface of the seal ring slides in close contact with a sliding surface formed at the rotary shaft, and accordingly, the seal ring seals a clearance between the rotary shaft and a housing to prevent leakage of sealed fluid (e.g., liquid).

For maintaining sealing properties in the seal ring for a long period of time, conflicting conditions of "sealing" and "lubrication" need to be satisfied. Particularly in recent years, while prevention of leakage of the sealed fluid has been made for, e.g., environmental measures, a demand for friction reduction has increased for reducing a mechanical loss. Friction reduction can be accomplished by the technique of generating a dynamic pressure between the sliding surfaces by rotation of the rotary shaft to slide the sliding surfaces with a fluid film of the sealed fluid being interposed.

For example, a seal ring as described in Patent Citation 1 has been known as the seal ring configured to generate the dynamic pressure between the sliding surfaces by rotation of the rotary shaft. The seal ring of Patent Citation 1 is attached to an annular groove provided at the outer periphery of a rotary shaft. The seal ring is pressed to a housing side and one side wall surface side of the annular groove by the pressure of high-pressure sealed fluid, and a sliding surface at one side surface of the seal ring slides in close contact with a sliding surface at one side wall surface of the annular groove. Moreover, at the sliding surface at one side surface of the seal ring, multiple dynamic pressure grooves opening on an inner diameter side are provided in a circumferential direction. The dynamic pressure groove includes a deep groove at the center in the circumferential direction and shallow grooves formed continuously to both sides of the deep groove in the circumferential direction, extending in the circumferential direction, and having bottom surfaces inclined such that the shallow grooves gradually become shallower toward terminal ends. When the rotary shaft and the seal ring rotate relative to each other, the sealed fluid is introduced from the inner diameter side of the sliding surface into the deep grooves. Moreover, a negative pressure is generated in each shallow groove of the seal ring on a side opposite to a rotation direction of the rotary shaft. Meanwhile, the sealed fluid introduced into the deep grooves is supplied to each shallow groove on the same side as the rotation direction, and therefore, a positive pressure is generated in such a shallow groove. Then, the positive pressure increases due to wedge action caused by the inclined bottom surface of the rotation-direction-side shallow groove, and is generated across the entirety of the dynamic pressure groove. Accordingly, the force of slightly separating the sliding surfaces from each other, i.e., so-called buoyancy, is obtained. The sliding surfaces are slightly separated from each other, and therefore, the high-pressure sealed fluid flows into a portion between the sliding surfaces from the inner diameter side of the sliding surface and the sealed fluid flows out of the rotation-direction-side shallow grooves generating the positive pressure to the portion between the sliding surfaces. Thus, a fluid film is formed between the sliding surfaces, and lubricity between the sliding surfaces is maintained.

CITATION LIST

Patent Literature

Patent Citation 1: JP 9-210211 A (third page, FIG. 3)

SUMMARY OF INVENTION

Technical Problem

In the seal ring of Patent Citation 1, the sliding surface of the rotary shaft moves relative to the dynamic pressure grooves in the circumferential direction. The positive pressure increases as the number of rotations of the rotary shaft increases, and the fluid film is formed between the sliding surfaces to enhance the lubricity of the sliding surface. However, the dynamic pressure groove is configured such that both shallow grooves are positioned on the same circumference with respect to the deep groove. Thus, particularly upon high-speed rotation, cavitation is caused in a region where a great positive pressure and a great negative pressure are generated in the circumferential direction. Due to greater variation in the buoyancy generated across the circumferential direction of the sliding surface, there is a probability that an adverse effect on the fluid film, such as a non-uniform fluid film, is caused and the lubricity becomes unstable.

The present invention has been made in view of such a problem, and an object of the present invention is to provide a seal ring configured so that stable lubrication performance can be provided across a wide range of rotation speed.

Solution to Problem

For solving the above-described problem, a seal ring according to the present invention is a seal ring for sealing a clearance between a rotary shaft and a housing, including multiple static pressure grooves provided at a sliding surface of the seal ring and arranged in a circumferential direction, the static pressure grooves being opened on a sealed fluid side and closed on an outer diameter side, a circumferential length of each of the static pressure grooves being shorter than a radial length of each of the static pressure grooves. According to the aforesaid feature, high-pressure sealed fluid introduced into the static pressure grooves mainly flows out to follow a rotation direction of the rotary shaft, and therefore, the sealed fluid is supplied to a wide area in a radial direction from an inner diameter side to the outer diameter side between the sliding surfaces. Thus, a fluid film can be formed with favorable balance in the circumferential direction, and stable lubrication performance can be provided across a wide range of rotation speed.

It may be preferable that each of the static pressure grooves is formed linearly in a radiation direction. According to this preferable configuration, the seal ring can be rotated in both directions upon use.

It may be preferable that the seal ring further comprises multiple extension grooves each extending in a circumferential direction and communicate with each of the static pressure grooves. According to this preferable configuration, the high-pressure sealed fluid is introduced into the extension groove extending in the circumferential direction.

Moreover, the sealed fluid flows out of the static pressure groove and the extension groove to follow the rotation direction of the rotary shaft, and flows out to the outer diameter side due to centrifugal force. Thus, the sealed fluid is supplied to a wide area in the radial direction and the circumferential direction between the sliding surfaces. Consequently, lubricity can be further enhanced.

It may be preferable that the seal ring further comprises multiple communication grooves each extending in a circumferential direction on the outer diameter side and each communicating with adjoining two of the static pressure grooves in the circumferential direction. According to this preferable configuration, the high-pressure sealed fluid introduced to the static pressure grooves is supplied to the outer diameter side of the sliding surface by the communication groove, and therefore, the lubricity can be further enhanced.

It may be preferable that the communication grooves are formed continuously in the circumferential direction. According to this preferable configuration, the sealed fluid can be supplied to the outer diameter side of the sliding surface across the circumferential direction by the communication groove, and therefore, the lubricity can be stably provided.

It may be preferable that the seal ring further comprises multiple dynamic pressure grooves each opened on the sealed fluid side and each provided so as to be sandwiched by adjoining two of the static pressure grooves in the circumferential direction. According to this preferable configuration, buoyancy can be generated by the dynamic pressure groove, and therefore, the lubricity can be further enhanced.

It may be preferable that each of the static pressure grooves may be formed deeper on the inner diameter side than on the outer diameter side. According to this preferable configuration, the flow of the sealed fluid is formed in the radial direction from the inner diameter side to the outer diameter side of the static pressure groove, and the sealed fluid is easily supplied.

BRIEF DESCRIPTION OF DRAWINGS

FIGS. 8A and 8B are partial side views of seal rings of variations A, B in the third embodiment.

FIGS. 11A to 11C are partial side views of seal rings of variations C to E in the fourth embodiment.

DESCRIPTION OF EMBODIMENTS

Figure 1:
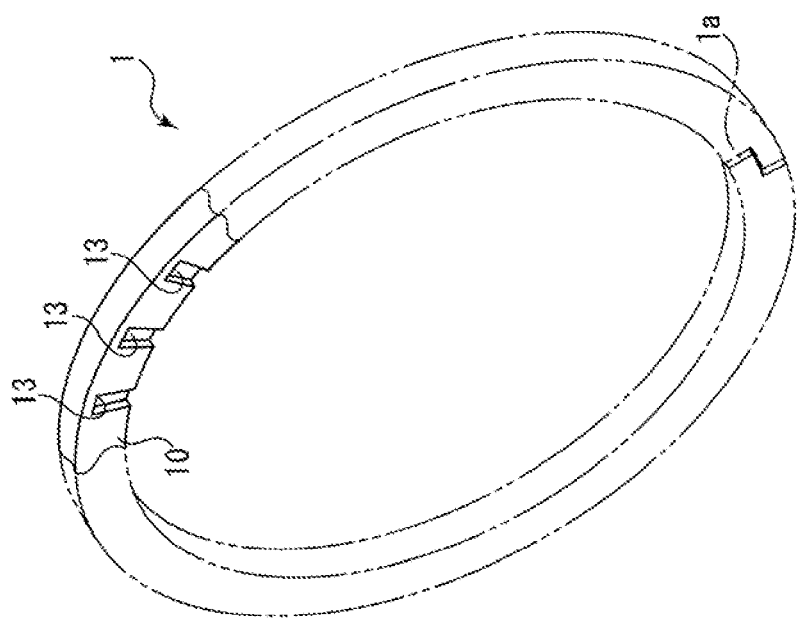
FIG. 1 is a perspective view illustrating a seal ring according to a first embodiment of the present invention by partially-simplified illustration.

Hereinafter, modes for carrying out a seal ring according to the present invention will be described based on embodiments.

First Embodiment

A seal ring according to a first embodiment of the present invention will be described with reference to FIGS. 1 to 4. Hereinafter, the right side in the plane of paper of FIG. 2 will be described as a sealed fluid side L, and the left side in the plane of paper will be described as an atmosphere side A. Note that the fluid pressure of sealed fluid on the sealed fluid side L will be described as a higher pressure than an atmospheric pressure. Moreover, a sliding surface includes a flat surface and a groove recessed as compared to the flat surface. For the sake of convenience in description, the flat surface forming the sliding surface is, in the drawings, indicated by the color of white, and the groove forming the sliding surface is indicated by dots.

The seal ring 1 according to the present embodiment seals a portion between a rotary shaft 2 and a housing 3 of a rotary machine, the rotary shaft 2 and the housing 3 rotating relative to each other. In this manner, the seal ring 1 partitions the inside of the housing 3 into the sealed fluid side L and the atmosphere side A (see FIG. 2), and prevents leakage of the sealed fluid from the sealed fluid side L to the atmosphere side A. Note that the rotary shaft 2 and the housing 3 are made of a metal material such as stainless steel. Moreover, the sealed fluid is one used for the purpose of cooling and lubricating, e.g., a not-shown gear and a not-shown bearing provided in a machine chamber of the rotary machine, such as oil.

Figure 2:
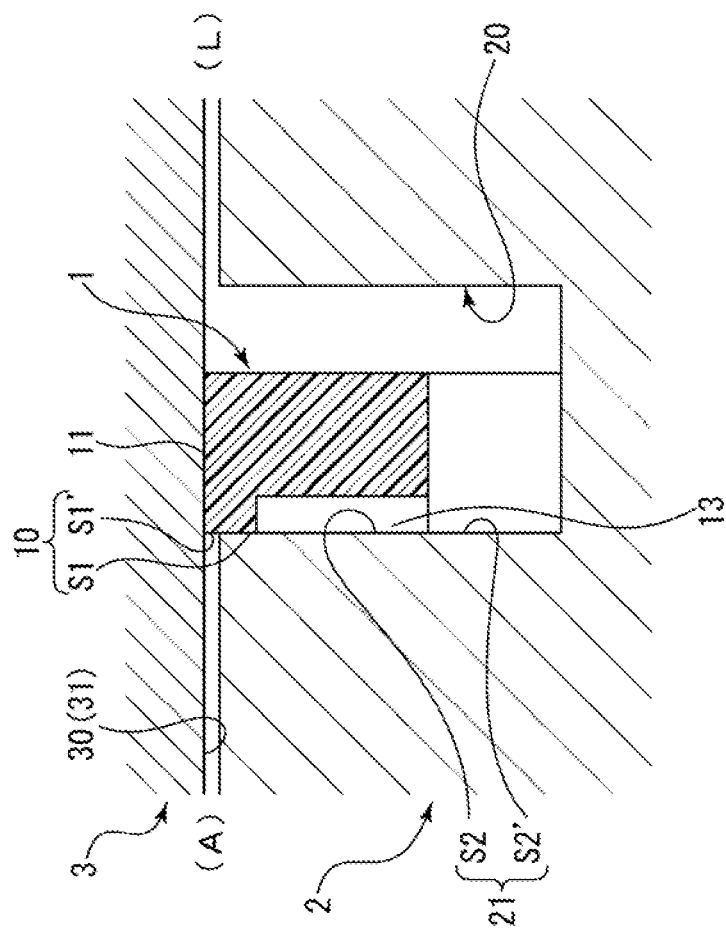
FIG. 2 is a sectional view illustrating a sealing structure for a clearance between a rotary shaft and a housing by the seal ring according to the first embodiment.

As illustrated in FIGS. 1 and 2, the seal ring 1 is a component molded with resin such as PTFE, and is provided with a joint portion 1a at one spot in a circumferential direction to form a C-shape. The seal ring 1 is used with the seal ring 1 being attached to an annular groove 20, the annular groove 20 being provided along the outer periphery of the rotary shaft 2 and having a rectangular sectional shape. Moreover, the seal ring 1 has a rectangular sectional shape. The seal ring 1 is pressed to the atmosphere side A by the fluid pressure of the sealed fluid acting on a side surface on the sealed fluid side L, and accordingly, a sliding surface S1 formed on a side surface 10 (hereinafter sometimes merely referred to as a "side surface 10") side on the atmosphere side A slidably closely contacts a sliding surface S2 on a side wall surface 21 (hereinafter sometimes merely referred to as a "side wall surface 21") side of the annular groove 20 on the atmosphere side A. Further, in response to stress in an expansion direction due to the fluid pressure of the sealed fluid acting on an inner circumferential surface, the seal ring 1 is pressed in an outer diameter direction, and accordingly, an outer circumferential surface 11 closely contacts an inner circumferential surface 31 of a shaft hole 30 of the housing 3.

Note that the sliding surfaces S1, S2 form a substantial sliding region between the side surface 10 of the seal ring 1 and the side wall surface 21 of the annular groove 20 of the rotary shaft 2. Moreover, a non-sliding surface S1' is formed continuously to an outer diameter side of the sliding surface S1 on the side surface 10 side, and a non-sliding surface S2' is formed continuously to an inner diameter side of the sliding surface S2 on the side wall surface 21 side (see FIG. 2).

As illustrated in FIGS. 1 to 4, the sliding surface S1 formed on the side surface 10 side of the seal ring 1 includes a flat surface 16 and static pressure grooves 13 provided in the circumferential direction. Note that the static pressure grooves 13 are arranged at equal intervals in the circumferential direction of the sliding surface S1, except for the vicinity of the joint portion 1a.

Figure 3:
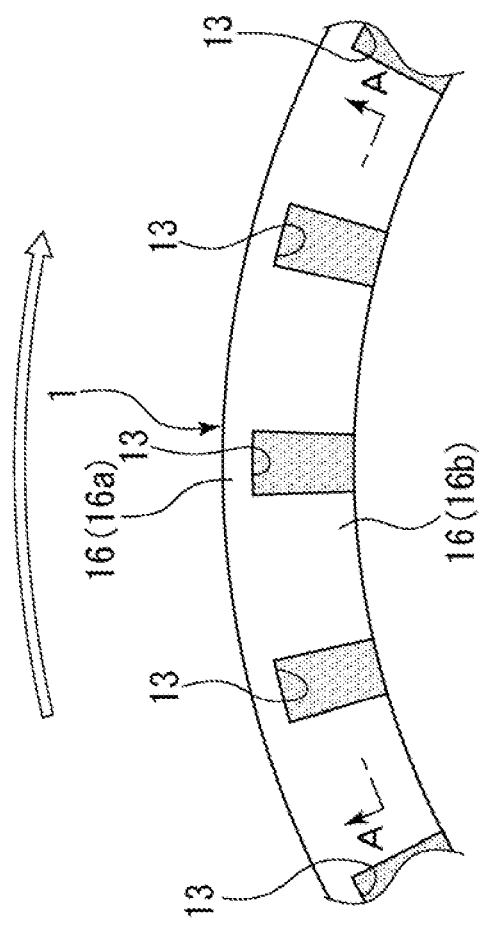
FIG. 3 is a partial side view of the seal ring according to the first embodiment.

The flat surface 16 includes a seal portion 16a positioned on the outer diameter side and formed continuously in a substantially annular shape across the joint portion 1a, and a lubrication portion 16b positioned on the inner diameter side, sandwiched by adjacent ones of the static pressure grooves 13 in the circumferential direction, and formed continuously to the seal portion 16a (see FIG. 3).

Figure 4:
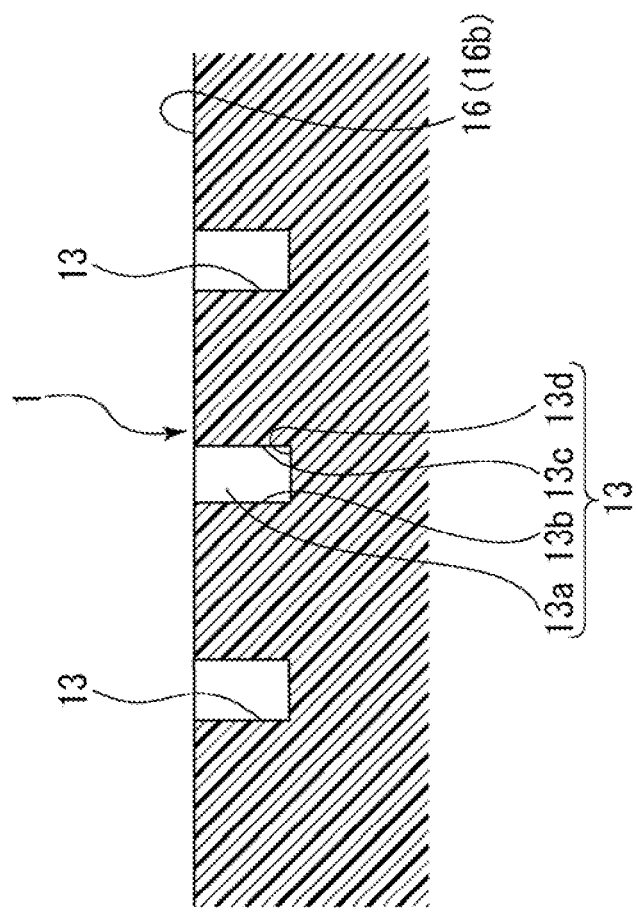
FIG. 4 is an A-A sectional view of the seal ring shown in of FIG. 3.

As illustrated in FIGS. 3 and 4, the static pressure groove 13 supplies, regardless of rotation/stop of the rotary shaft 2, the sealed fluid to a portion between the sliding surfaces S1, S2 when the sealed fluid has a higher pressure than that of atmospheric air. The static pressure groove 13 is formed linearly in a radiation direction, and has a substantially rectangular shape as viewed from the side. The static pressure groove 13 opens on the inner diameter side (i.e., the sealed fluid side) of the seal ring 1, and is closed on the outer diameter side. Moreover, a bottom surface 13d of the static pressure groove 13 is formed flat, and is parallel with the flat surface 16. The depth of the static pressure groove 13 is several tens to several hundreds of μm and preferably 100 to 200 μm. Note that the depth of the static pressure groove 13 may be deeper up to about a depth of 1 mm. Moreover, any of three side surfaces 13a, 13b, 13c of the static pressure groove 13 extends perpendicularly from the bottom surface 13d (specifically see FIG. 4).

Next, fluid film formation between the sliding surfaces S1, S2 upon rotation of the rotary shaft 2 will be described. Note that a case where the rotary shaft 2 rotates clockwise as indicated by a white arrow in FIG. 3, i.e., a case where the seal ring 1 rotates counterclockwise relative to the annular groove 20 of the rotary shaft 2 in FIG. 3, will be described herein by way of example. Upon relative rotation of the rotary shaft 2 and the housing 3, the sliding surface S1 on the side surface 10 side slides on the sliding surface S2 on the side wall surface 21 side. At this point, the sealed fluid is introduced from the inner diameter side to the static pressure grooves 13 provided at the sliding surface S1. Moreover, the high-pressure sealed fluid is introduced to the static pressure grooves 13. High-pressure static pressure force of the sealed fluid acts on the sliding surface S2 on the side wall surface 21 side of the opposing rotary shaft 2, and therefore, the force of slightly separating the sliding surfaces S1, S2 from each other, i.e., so-called buoyancy, is obtained. The sliding surfaces S1, S2 are slightly separated from each other, and therefore, the high-pressure sealed fluid flows into the portion between the sliding surfaces S1, S2 from the inner diameter side and the sealed fluid mainly flows out of the static pressure grooves 13 to the portion between the sliding surfaces S1, S2 to follow a rotation direction of the rotary shaft 2.

According to such a configuration, the high-pressure sealed fluid introduced into the static pressure grooves 13 continuously opening in a radial direction from the inner diameter side to the outer diameter side of the sliding surface S1 mainly flows out to follow the rotation direction of the rotary shaft 2, and therefore, the sealed fluid is supplied to a wide area in the radial direction from the inner diameter side to the outer diameter side between the sliding surfaces S1, S2. Thus, the seal ring 1 can form a fluid film with favorable balance in the circumferential direction, and can provide stable lubrication performance across a wide range of rotation speed.

Moreover, the sealed fluid is stored in the static pressure grooves 13 and lubrication between the sliding surfaces S1, S2 is promoted, and therefore, abrasion of the sliding surface S1 can be reduced.

Further, the static pressure groove 13 is formed linearly in the radiation direction, and therefore, the seal ring 1 can be rotated in both directions upon use.

In addition, the seal ring 1 is in the C-shape, and therefore, seal performance can be stably maintained even when the circumferential length of the seal ring 1 changes due to thermal expansion/contraction.

Second Embodiment

Figure 5:
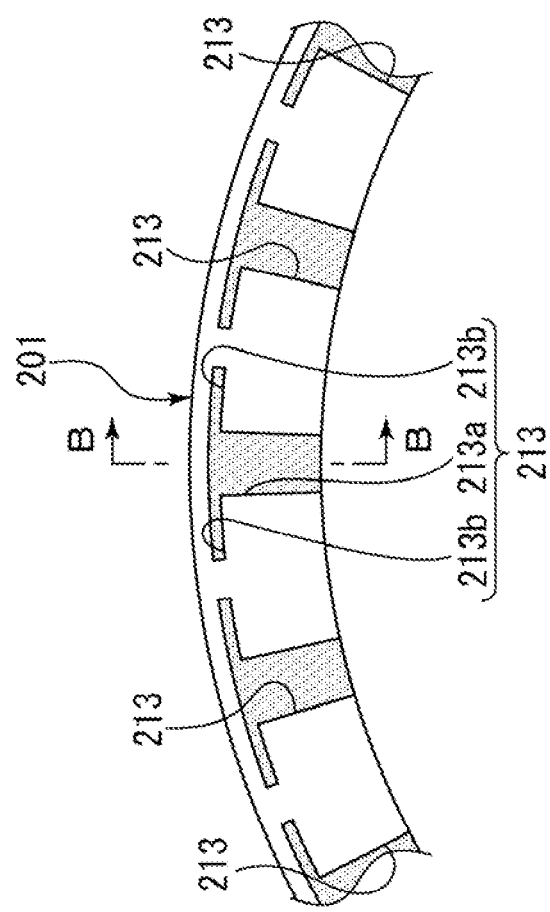
FIG. 5 is a partial side view of a seal ring according to a second embodiment of the present invention.
Figure 6:
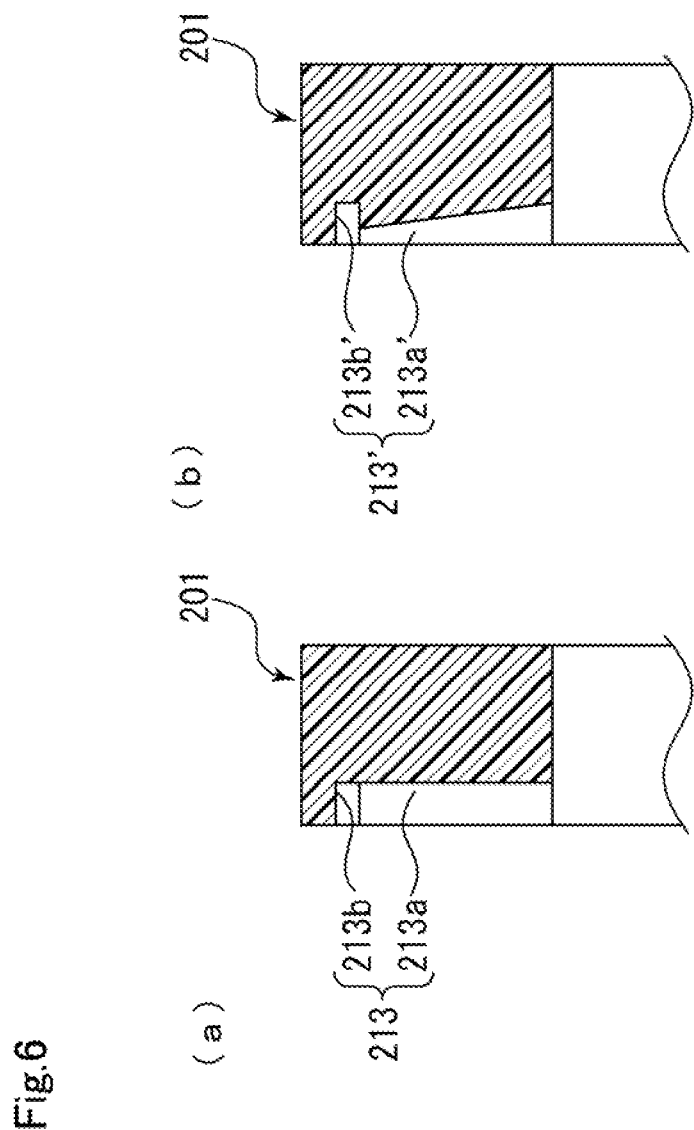
FIG. 6A is a B-B sectional view of the seal ring shown in FIG. 5.
FIG. 6B is a sectional view illustrating a variation of a static pressure groove and an extension groove in the second embodiment.

Next, a seal ring according to a second embodiment of the present invention will be described with reference to FIGS. 5 and 6. Note that the same reference numerals are used to represent the same components as those described in the above-described embodiment, and overlapping description thereof will be omitted.

The seal ring 201 in the second embodiment will be described. As illustrated in FIG. 5, in the present embodiment, a static pressure groove 213 supplies, regardless of rotation/stop of a rotary shaft 2, sealed fluid to a portion between sliding surfaces S1, S2 when the sealed fluid has a higher pressure than that of atmospheric air. The static pressure groove 213 is formed linearly in a radiation direction, and has a substantially rectangular shape as viewed from the side. The static pressure groove 213 has an introduction groove 213a opening on an inner diameter side (i.e., the sealed fluid side) of the seal ring 201 and closed on an outer diameter side, and a pair of extension grooves 213b extending to both sides in a circumferential direction from the outer diameter side of the introduction groove 213a on the same circumference.

Moreover, as illustrated in FIG. 6A, the introduction groove 213a and the extension grooves 213b of the static pressure groove 213 are formed with the substantially same depth.

According to such a configuration, the high-pressure sealed fluid introduced through openings of the introduction grooves 213a of the static pressure grooves 213 is introduced into the extension grooves 213b extending in the circumferential direction on the outer diameter side. Moreover, the sealed fluid flows out of the introduction grooves 213a and the extension grooves 213b to follow a rotation direction of the rotary shaft 2, and flows out to the outer diameter side due to centrifugal force. Thus, the sealed fluid is supplied to a wide area in a radial direction and the circumferential direction between the sliding surfaces S1, S2, and therefore, lubricity of the seal ring 201 can be enhanced. Further, the extension grooves 213b are formed so that a contact area (i.e., the area of a flat surface 16) between the sliding surfaces S1, S2 can be decreased. In addition, the sealed fluid is stored in the introduction grooves 213a and the extension grooves 213b and lubrication between the sliding surfaces S1, S2 is promoted, and therefore, abrasion of the sliding surface S1 can be reduced.

Note that the extension groove 213b may be formed at any position in the radial direction from the inner diameter side to the outer diameter side of the introduction groove 213a. Moreover, multiple extension grooves 213b may be formed in the radial direction. Further, the extension groove 213*b* may be formed only on one side (preferably a rotational direction side of the rotary shaft 2) in the circumferential direction.

Note that as illustrated in FIG. 6B, a static pressure groove 213' may be formed such that the depth of an introduction groove 213*a*' on the inner diameter side is deeper than that on the outer diameter side, and an extension groove 213*b*' may be formed with the substantially same depth as that of the introduction groove 213*a*' on the inner diameter side. According to such a configuration, the sealed fluid easily flows from the inner diameter side to the outer diameter side of the introduction groove 213*a*', and therefore, is easily introduced into the extension grooves 213*b*'. Consequently, the lubricity of the seal ring 201 can be further enhanced.

Note that the static pressure groove 213 in the seal ring 201 of the second embodiment may be formed with the same depth from the inner diameter side to the outer diameter side, or may be formed with a smaller depth on the inner diameter side than on the outer diameter side.

Third Embodiment

Figure 7:
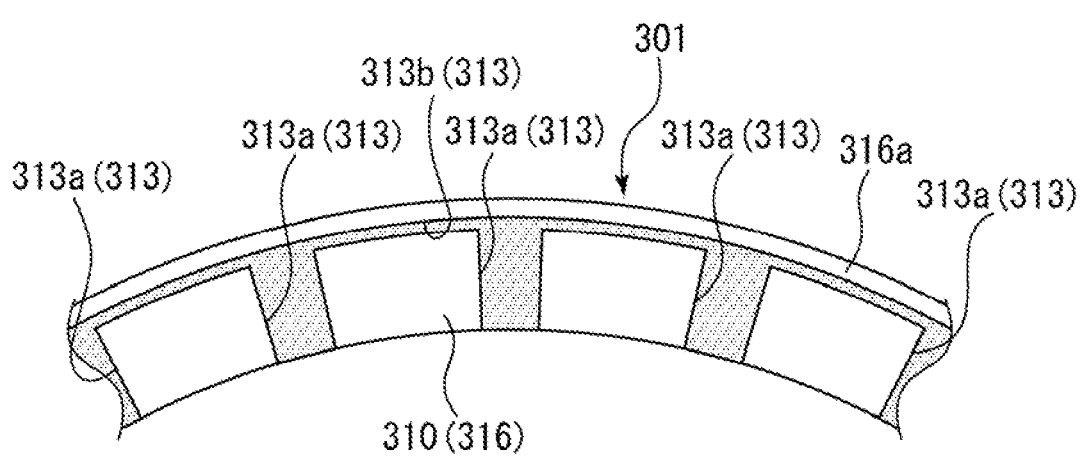
FIG. 7 is a partial side view of a seal ring according to a third embodiment of the present invention.

Next, a seal ring according to a third embodiment of the present invention will be described with reference to FIG. 7. Note that the same reference numerals are used to represent the same components as those described in the above-described embodiments, and overlapping description thereof will be omitted.

The seal ring 301 in the third embodiment will be described. As illustrated in FIG. 7, in the present embodiment, a static pressure groove 313 supplies, regardless of rotation/stop of a rotary shaft 2, sealed fluid to a portion between sliding surfaces S1, S2 when the sealed fluid has a higher pressure than that of atmospheric air. The multiple static pressure grooves 313 are formed linearly in a radiation direction, and have a substantially rectangular shape as viewed from the side. The static pressure groove 313 has an introduction groove 313*a* opening on an inner diameter side (a sealed fluid side) of the seal ring 301 and closed on an outer diameter side, and an arc-shaped communication groove 313*b* extending in a circumferential direction on the outer diameter side and communicated with all introduction grooves 313*a*. Note that the communication groove 313*b* is formed on the outer diameter side of a flat surface 316 and the inner diameter side of a seal portion 316*a* continuously formed in a substantially annular shape across a joint portion 1*a* (see FIG. 1).

Moreover, for the sake of convenience in description, the introduction groove 313*a* and the communication groove 313*b* of the static pressure groove 313 are formed with the substantially same depth although not shown in the figure.

According to such a configuration, the communication groove 313*b* is provided for the static pressure grooves 313 so that sealed fluid can flow out to a wide area in the circumferential direction on the outer diameter side between the sliding surfaces S1, S2 and lubricity of the seal ring 301 can be enhanced. Moreover, the communication groove 313*b* is formed in the substantially annular shape, and therefore, the sealed fluid in the communication groove 313*b* generates a flow in the circumferential direction in association with rotation of the rotary shaft 2 and is stably held in the communication groove 313*b*. Consequently, the sealed fluid can be reliably supplied to the portion between the sliding surfaces S1, S2.

Note that the static pressure groove 313 may be formed such that the depth of the introduction groove 313*a* on the inner diameter side is deeper than that on the outer diameter side, and the communication groove 313*b* may be formed with the substantially same depth as that of the introduction groove 313*a* on the inner diameter side. According to such a configuration, the sealed fluid easily flows from the inner diameter side to the outer diameter side of the introduction groove 313*a*, and therefore, is easily introduced into the communication groove 313*b*. Consequently, the lubricity of the seal ring 301 can be further enhanced.

Moreover, as in a variation A of the seal ring 301 in the third embodiment as illustrated in FIG. 8A, the communication groove 313*b* may be formed to extend in the circumferential direction from multiple spots in a radial direction (e.g., a double threaded shape).

Further, as in a variation B of the seal ring 301 in the third embodiment as illustrated in FIG. 8B, the communication groove 313*b* may be formed in a wave shape. According to such a configuration, the sealed fluid can flow out to a wide area of the sliding surface S1 on the outer diameter side from the communication groove 313*b*, and the area of the communication groove 313*b* can be increased. Thus, the lubricity of the seal ring 301 can be further enhanced.

Fourth Embodiment

Next, a seal ring according to a fourth embodiment of the present invention will be described with reference to FIGS. 9 and 10. Note that the same reference numerals are used to represent the same components as those described in the above-described embodiments, and overlapping description thereof will be omitted.

The seal ring 401 in the fourth embodiment will be described. As illustrated in FIG. 9, in the present embodiment, a sliding surface S1 (see FIG. 2) formed at a side surface 410 of the seal ring 401 mainly includes a flat surface 416, multiple static pressure grooves 413 formed linearly in a radiation direction, having a substantially rectangular shape as viewed from the side, and each having introduction grooves 413*a* opening on an inner diameter side (a sealed fluid side) of the seal ring 401 and closed on an outer diameter side and an arc-shaped communication groove 413*b* extending in a circumferential direction on the outer diameter side and communicated with all introduction grooves 413*a*, and dynamic pressure grooves 412 each provided between adjacent ones of the introduction grooves 413*a* in the circumferential direction. Note that the introduction grooves 413*a* of the static pressure grooves 413 and the dynamic pressure grooves 412 are arranged at equal intervals in the circumferential direction of the sliding surface S1, except for the vicinity of a joint portion 1*a*. The introduction grooves 413*a* and the dynamic pressure grooves 412 are alternately provided across the circumferential direction.

Figure 9:
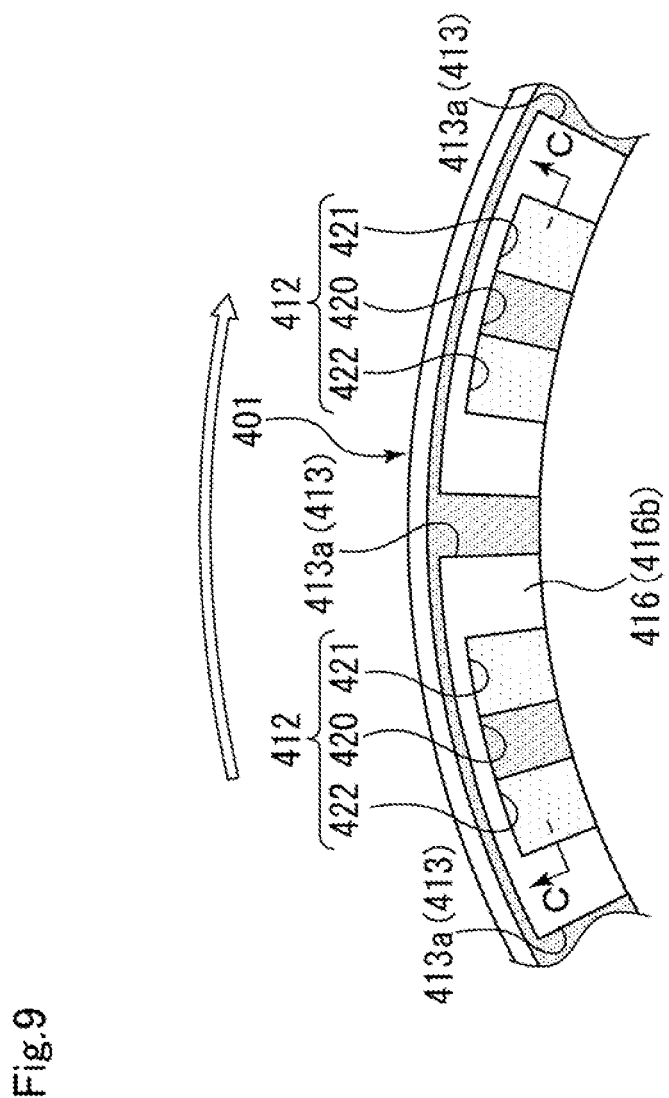
FIG. 9 is a partial side view of a seal ring in a fourth embodiment according to the present invention.
Figure 10:
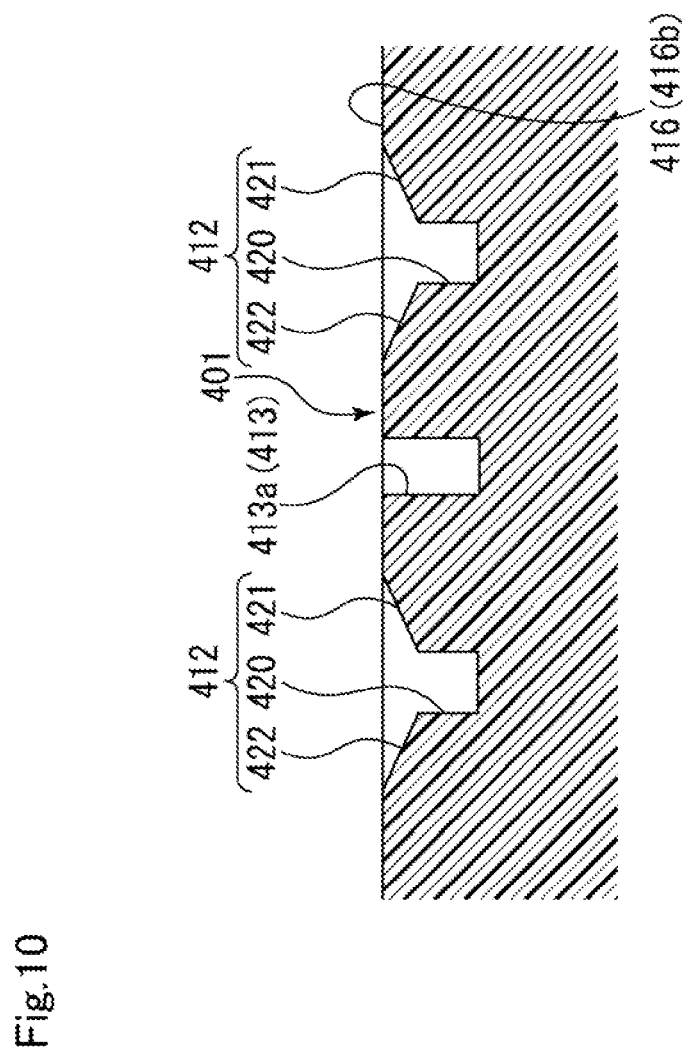
FIG. 10 is a C-C sectional view of the seal ring shown in FIG. 9.

As illustrated in FIGS. 9 and 10, the dynamic pressure groove 412 has the function of generating a dynamic pressure according to rotation of a rotary shaft 2, and opens on the inner diameter side (i.e., the sealed fluid side) of the seal ring 401. The dynamic pressure groove 412 includes a deep groove 420 provided at the center in the circumferential direction and a pair of shallow grooves 421, 422 formed continuously from both sides of the deep groove 420 in the circumferential direction and extending in the circumferential direction. Note that in FIGS. 9 and 10, the right side with respect to the deep groove 420 in the plane of paper will be described as the shallow groove 421, and the left side in the plane of paper will be described as the shallow groove 422.

Specifically, as illustrated in FIG. 10, the deep groove 420 has a bottom surface formed flat, and the shallow grooves 421, 422 have bottom surfaces as inclined surfaces formed such that the shallow grooves 421, 422 gradually become shallower from a deep groove 420 side to terminal ends in the circumferential direction. Moreover, the bottom surface of the deep groove 420 is formed deeper than deepest portions of the shallow grooves 421, 422, and the depth of the deep groove 420 is several tens to several hundreds of μm and preferably 100 to 200 μm.

Next, fluid film formation between the sliding surfaces S1, S2 upon rotation of the rotary shaft 2 will be described. Note that a case where the rotary shaft 2 rotates clockwise as indicated by a white arrow in FIG. 9, i.e., a case where the seal ring 401 rotates counterclockwise relative to an annular groove 20 of the rotary shaft 2 in FIG. 9, will be described herein by way of example. Upon relative rotation of the rotary shaft 2 and a housing 3, the sliding surface S1 on a side surface 410 side slides on the sliding surface S2 on a side wall surface 21 side. At this point, sealed fluid is introduced from the inner diameter side to the introduction grooves 413a of the static pressure grooves 413 and the deep grooves 420 of the dynamic pressure grooves 412 provided at the sliding surface S1. Moreover, a negative pressure is generated in each shallow groove 422 (hereinafter merely referred to as a "shallow groove 422") of the seal ring 401 on a side (i.e., the left side in the plane of paper of FIG. 9) opposite to a rotation direction of the rotary shaft 2. Meanwhile, the sealed fluid introduced into the deep grooves 420 is supplied to each shallow groove 421 (hereinafter merely referred to as a "shallow groove 421") of the seal ring 401 on the same side (i.e., the right side in the plane of paper of FIG. 9) as the rotation direction, and a positive pressure is generated in such a shallow groove 421 due to wedge action caused by the inclined surface. Then, the positive pressure is generated across the entirety of the dynamic pressure groove 412, and accordingly, the force of slightly separating the sliding surfaces S1, S2 from each other, i.e., so-called buoyancy, is obtained. Note that it is configured such that the positive pressure generated in the dynamic pressure groove 412 is higher than the static pressure force generated in the static pressure groove 13 described above in the first embodiment and the buoyancy is mainly obtained by the positive pressure generated in the dynamic pressure groove 412. The sliding surfaces S1, S2 are slightly separated from each other, and therefore, the high-pressure sealed fluid flows into a portion between the sliding surfaces S1, S2 from the inner diameter side and the sealed fluid flows out of the shallow groove 421 generating the positive pressure to the portion between the sliding surfaces S1, S2. Further, the force of sucking the sealed fluid present between the sliding surfaces S1, S2 around the dynamic pressure groove 412 acts on the shallow groove 422 generating the negative pressure in the dynamic pressure groove 412. Thus, the sealed fluid is supplied to the shallow groove 422 and a surrounding lubrication portion 416b thereof from the introduction groove 413a of the static pressure groove 413 adjacent to such a shallow groove 422 in the circumferential direction.

According to such a configuration, the sealed fluid is supplied from the introduction groove 413a of the static pressure groove 413 to which the high-pressure sealed fluid is introduced to the shallow groove 422 positioned adjacent to such an introduction groove 413a in the circumferential direction and generating the negative pressure. Thus, the sealed fluid is held on the shallow groove 422 and the surrounding lubrication portion 416b thereof, and is sufficiently supplied from the deep groove 420 and the shallow groove 422 to the shallow groove 421 generating the positive pressure. Consequently, a fluid film can be formed between the sliding surfaces S1, S2 across a wide range of rotation speed, and lubricity of the seal ring 401 can be enhanced.

Moreover, the shallow groove 422 generating the negative pressure in the dynamic pressure groove 412 opens on the inner diameter side (i.e., the sealed fluid side), and the sealed fluid is also introduced from the inner diameter side of the sliding surface S1. Thus, the sealed fluid is easily held on the shallow groove 422.

Further, the sealed fluid is supplied from the introduction groove 413a of the static pressure groove 413 to the shallow groove 422 positioned adjacent to such an introduction groove 413a in the circumferential direction and generating the negative pressure. Thus, in the shallow groove 422 generating the negative pressure in the dynamic pressure groove 412, the sealed fluid is held, and the negative pressure is reduced. Consequently, the dynamic pressure can be generated in a state in which variation in a pressure (the positive pressure and the negative pressure) in the circumferential direction is reduced corresponding to the formation positions of the dynamic pressure grooves 412 in a radial direction between the sliding surfaces S1, S2. As a result, vibration due to, e.g., cavitation can be prevented while the lubricity of the seal ring 401 can be enhanced.

In addition, the introduction groove 413a of the static pressure groove 413 is formed longer in the radial direction than the dynamic pressure groove 412 (specifically the shallow groove 422), and therefore, the sealed fluid can be supplied to the shallow groove 422 generating the negative pressure from the introduction groove 413a adjacent to such a shallow groove 422 in the circumferential direction to reduce occurrence of cavitation. Further, the introduction groove 413a extends to a position on the outer diameter side with respect to the dynamic pressure groove 412, and therefore, the sealed fluid can be supplied to the outer diameter side (i.e., the outer diameter side with respect to the dynamic pressure groove 412) of the sliding surface S1 to form the fluid film between the sliding surfaces S1, S2. Consequently, the lubricity of the seal ring 401 can be further enhanced. In addition, the communication groove 413b is provided so that the sealed fluid can flow out to a wide area in the circumferential direction on the outer diameter side between the sliding surfaces S1, S2 and the lubricity of the seal ring 401 can be further enhanced.

Moreover, the introduction groove 413a of the static pressure groove 413 is provided at a position sandwiched by the dynamic pressure grooves 412 in the circumferential direction. Thus, even when the seal ring 401 rotates in any direction, the sealed fluid can be reliably supplied to the shallow groove 422 generating the negative pressure from the introduction groove 413a adjacent to such a shallow groove 422 in the circumferential direction. Further, the introduction grooves 413a and the dynamic pressure grooves 412 are alternately provided across the circumferential direction of the sliding surface S1, and therefore, the sealed fluid is supplied to all dynamic pressure grooves 412 from the introduction grooves 413a adjacent to these dynamic pressure grooves 412 in the circumferential direction. Thus, the buoyancy can be generated with favorable balance across the circumferential direction of the sliding surface S1. Moreover, the dynamic pressure grooves 412 are formed in addition to the static pressure grooves 413, and therefore, a contact area (the area of the flat surface 416)

between the sliding surfaces S1, S2 can be decreased. Thus, abrasion of the sliding surface S1 can be reduced.

Further, the dynamic pressure groove 412 includes the deep groove 420 opening on the inner diameter side at the center in the circumferential direction and the shallow grooves 421, 422 formed continuously to both sides of the deep groove 420 in the circumferential direction, extending in the circumferential direction, and having the bottom surfaces inclined such that the shallow grooves 421, 422 gradually become shallower toward the terminal ends in the circumferential direction. Thus, the seal ring 401 can be rotated in both directions upon use, and even upon high-speed rotation, the sealed fluid can be reliably supplied to any of the shallow grooves 421, 422 through the deep grooves 420.

In addition, as in variations C to E of the seal ring 401 in the fourth embodiment as illustrated in FIGS. 11A to 11C, the dynamic pressure groove 412 may be freely formed, and may be formed as, e.g., a T-shaped groove, a Rayleigh step, or a spiral groove.

The embodiments of the present invention have been described above with reference to the drawings, but specific configurations are not limited to these embodiments. The present invention also includes even changes and additions made without departing from the scope of the present invention.

For example, the configuration of the static pressure groove described in the first embodiment, the configuration of the introduction groove and the extension groove of the static pressure groove described in the second embodiment, and the configurations of the introduction grooves and the communication grooves of the static pressure grooves described in the variations A, B of the third embodiment may be applied to the fourth embodiment.

Moreover, the number and shape of static pressure grooves (introduction grooves) provided at the sliding surface S1 of the seal ring and the number and shape of dynamic pressure grooves provided at the sliding surface S1 of the seal ring may be changed as necessary such that a desired dynamic pressure effect is obtained. Note that the location and shape of the static pressure groove (including the introduction groove) to which the sealed fluid is introduced and the location and shape of the deep groove of the dynamic pressure groove to which the sealed fluid is introduced may be changed as necessary according to the assumed degree of abrasion of the sliding surface.

Further, the shapes of the bottom and side surfaces of the static pressure groove (including the introduction groove) are not limited to the rectangular shape, and may be freely formed. The side surface may extend with a slope from the bottom surface.

In addition, the seal ring may be formed in an annular shape without the joint portion 1a, and the outer shape thereof is not limited to a circular shape as viewed from the side. The seal ring may be formed in a polygonal shape.

Moreover, the seal ring is not limited to the rectangular sectional shape, and for example, may have a trapezoidal sectional shape or a polygonal sectional shape. The seal ring may be configured such that the side surface forming the sliding surface S1 is inclined.

Further, the grooves described in the above-described embodiments may be formed at the sliding surface S2 of the annular groove 20 of the rotary shaft 2.

In addition, the oil has been described as the example of the sealed fluid, but the sealed fluid may be liquid such as water or coolant or gas such as air or nitrogen.

REFERENCE SIGNS LIST 1 to 401 Seal ring
2 Rotary shaft
3 Housing
10 Side surface
13 Static pressure groove
16 Flat surface
16a Seal portion
16b Lubrication portion
20 Annular groove
21 Side wall surface
213, 213' Static pressure groove
213a, 213a' Introduction groove
213b, 213b' Extension groove
313 Static pressure groove
313a Introduction groove
313b Communication groove
316 Flat surface
316a Seal portion
410 Side surface
412 Dynamic pressure groove
413 Static pressure groove
413a Introduction groove
413b Communication groove
416 Flat surface
416b Lubrication portion
420 Deep groove
421, 422 Shallow groove
S1, S2 Sliding surface
S1', S2' Non-sliding surface

The invention claimed is:

1. A seal ring for sealing a clearance between a rotary shaft and housing, comprising:
   multiple static pressure grooves provided at a sliding surface of the seal ring and arranged in a circumferential direction, the static pressure grooves being opened on a sealed fluid side and closed on an outer diameter side, a circumferential length of each of the static pressure grooves being shorter than a radial length of each of the static pressure grooves;
   multiple communication grooves each extending in the circumferential direction on the outer diameter side, each of the communication grooves respectively being in communication with two of the static pressure grooves adjoining each other in the circumferential direction; and
   multiple dynamic pressure grooves each opened on the sealed fluid side, each of the dynamic pressure groove respectively being provided between two of the static pressure grooves adjoining each other in the circumferential direction,
   wherein the static pressure grooves each has a depth which is in a range from 100 μm to 1 mm.

2. The seal ring according to claim 1, wherein each of the static pressure grooves is formed linearly in a radiation direction.

3. The seal ring according to claim 1, wherein the communication grooves together form a continuous annular path.

4. The seal ring according to claim 1, wherein each of the static pressure grooves is formed deeper on an inner diameter side than on the outer diameter side.

5. The seal ring according to claim 2, wherein
each of the static pressure grooves is formed deeper on an
inner diameter side than on the outer diameter side.

\* \* \* \* \*